July 24, 1928.
S. TRENNER
1,678,540
PIPETTE
Filed April 28, 1925
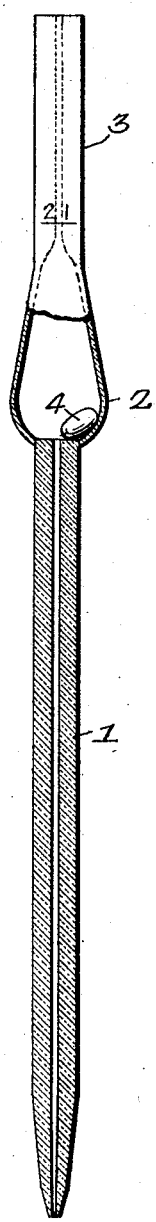
Inventor.
Simeon Trenner.
by his Attorneys,
Howson + Howson Patented July 24, 1928.

1,678,540

UNITED STATES PATENT OFFICE.

SIMEON TRENNER, OF PHILADELPHIA, PENNSYLVANIA.

PIPETTE.

Application filed April 28, 1925. Serial No. 26,472.

This invention relates to pipettes of the type used for collecting and diluting blood for blood cell count or other purpose, and the object of the invention is to materially facilitate the collection of an accurately measured quantity of blood and the making of an accurate dilution.

I accomplish this by means of a pipette of novel and improved construction, as illustrated in the attached drawing, which shows in longitudinal section a pipette made in accordance with my invention. The device comprises a capillary tube 1, preferably ground or drawn to a dull point at one end, and connecting at the other end with a mixing chamber 2. From the opposite side of the chamber 2 extends a second tube 3 to receive the rubber tube and mouthpiece ordinarily used to create a suction in the chamber 2 tending to draw the blood from the source into the tube 1 and the diluting fluid into the chamber 2. A mixing bead 4 is provided in the chamber 2. The manipulation of the usual type device is well understood in the art and requires no further description.

Heretofore it has been customary to graduate or mark the tube 1 to indicate measured quantities when the upper level of the blood in the tube corresponds with the marks or graduations. It is extremely difficult with this method of measuring to constantly obtain with the highest possible degree of accuracy a desired quantity of blood, this by reason of the extreme difficulty of interrupting the flow in the capillary tube at any point with sufficient precision so that the top of the column registers accurately with a predeterminable or selected marking.

I have devised means whereby an accurately measured quantity of blood may be collected and whereby after the capillary action has been started, the measuring operation is an automatic one in the sense that the influx of blood automatically ceases when the desired quantity has entered the tube 1.

In practicing my invention, I form the tube 1 of predetermined and accurately measured length or volume, it thereby holding when full of blood (or with any fluid of approximately the same physical characteristics) the exact desired quantity, and I so bring the tube into the chamber 2 that the capillary passage ends abruptly and without material change in its cross sectional area which is substantially uniform, at least at its upper end.

With the outer end of the tube 1 immersed in the emerging drop of blood from finger or ear and with sufficient suction impressed through the tube 3 upon the chamber 2 to start the flow of blood into the tube 1, the blood will continue to rise in the tube by capillary action after the suction is removed until it reaches the upper end where it automatically stops, the capillarity stopping abruptly at that point. The end of the tube may then be immersed in the diluting fluid and suction again applied to bring the mixture to the graduation on the tube 3 marked to indicate the dilution. By this means, it is possible without difficulty and with certainty to collect in the pipette an accurately measured quantity of blood which may be mixed with other fluid in the mixing chamber and diluted in a fixed and predeterminable proportion.

One method of manufacturing the pipette is to form the tube 1 as an independent element and to join this tube to the bottom of the chamber 2, the latter being formed integrally with the tube 3. I do not wish, however, to be limited to any particular method of manufacture.

Obviously there may be some modification without departure from the essential features of the invention. I may for example eliminate the graduation on the tube 3 and terminate this tube close to the chamber 2, and employ the same principle as in the tube 1 for automatically stopping the capillary flow in tube 3 after the chamber 2 becomes full.

I claim:

1. A pipette comprising a chamber, and a capillary passage terminating abruptly in said chamber so that the area of the passage at the point where it enters the chamber is substantially the same as that of the rest of the passage.

2. A pipette comprising a chamber, a passage communicating with the chamber and of such bore that movement of a liquid therein when once initiated may be continued from the source by capillary action, and means whereby the said movement of the liquid is automatically interrupted at a predetermined point to afford an accurate measure of the liquid taken into the chamber.

3. A pipette comprising a chamber, and a passage of predetermined and accurately measured length and of such bore that movement of a liquid therein when once initiated may be continued from the source by capillary action, said passage terminating abruptly in said chamber so that the said movement of the liquid in the passage is automatically interrupted at the point where the passage enters the chamber.

4. A pipette comprising a capillary passage of such bore that movement of a liquid therein when once initiated may be continued from the source by capillary action, said passage terminating at its inner end abruptly in a right plane, and a chamber communicating with said passage.

SIMEON TRENNER.